(12) United States Patent
Inada (10) Patent No.: US 7,557,945 B2
(45) Date of Patent: Jul. 7, 2009

(54) SYSTEM FOR BROWSING COMMUNICATION DETAILS FOR FACSIMILE COMMUNICATIONS WITH USER RESTRICTING CAPABILITY (75) Inventor: Hajime Inada, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 989 days.

(21) Appl. No.: 10/809,434

(22) Filed: Mar. 26, 2004

(65) Prior Publication Data
US 2004/0246532 A1 Dec. 9, 2004

(30) Foreign Application Priority Data
Mar. 28, 2003 (JP) .......................... P2003-092430

(51) Int. Cl.
G06F 15/00 (2006.01)
(52) U.S. Cl. .................... 358/1.15; 358/1.16; 358/1.18; 358/402; 358/403; 709/206; 709/216; 709/225
(58) Field of Classification Search ................ 358/1.15, 358/1.16, 1.18, 400, 402, 403, 444; 709/206, 709/214, 216, 225, 226
See application file for complete search history.

(56) References Cited
U.S. PATENT DOCUMENTS
5,293,253 A * 3/1994 Kida et al. .................. 358/440
6,072,599 A * 6/2000 Oba et al. ................... 358/444
6,350,066 B1 * 2/2002 Bobo, II ..................... 709/206
6,704,775 B1 * 3/2004 Sato et al. ................... 709/219
2003/0103242 A1 * 6/2003 Tanimoto .................... 358/402
2003/0117666 A1 * 6/2003 Eguchi et al. ............... 358/402
2003/0145281 A1 * 7/2003 Thames et al. .............. 715/513
2003/0169449 A1 * 9/2003 Iida ........................... 358/1.15

FOREIGN PATENT DOCUMENTS
JP A 11-112716 4/1999
JP 2000-196799 7/2000

* cited by examiner

Primary Examiner—Chan S Park
(74) Attorney, Agent, or Firm—Oliff & Berridge, PLC (57) ABSTRACT When log data is stored in a shared area of RAM provided in a multifunction device, a personal computer generates and transmits a log page having links to image data. These links are links to files (image data) registered in a log table. The log table includes a list of content identified by the log data stored in the RAM of the multifunction device. This log data can identify a file only when the multifunction device determines that the image data may be recorded. Accordingly, the personal computer can generate log pages having links to files for which image data can be recorded, that is, files that can be made public via a communication network.

10 Claims, 9 Drawing Sheets

| DATE | TIME | TYPE | FROM/TO | DURATION | PAGE | RESULT | FILE NAME |
|---|---|---|---|---|---|---|---|
| 2003/2/10 | 15:10 | Rx(RECEIVE) | AAAAAA | 100 | 3 | OK | 200302101510 |
| 2003/2/11 | 10:20 | Tx(TRANSMISSION) | BBBBB | 20 | 2 | OK | 200302111020 |

SYSTEM FOR BROWSING COMMUNICATION DETAILS FOR FACSIMILE COMMUNICATIONS WITH USER RESTRICTING CAPABILITY

BACKGROUND OF THE INVENTION

1. Field of the Invention

The present invention relates generally to a communication system for transmitting and receiving image data through facsimile communications. More particularly, the invention relates to a system for browsing communication details for facsimile communications with user restricting capability.

2. Description of the Related Art

Conventional communication devices having a facsimile function are generally configured to accumulate in memory communication details for image data transferred in facsimile communications (such as transmission destination, transmission source, communication time, length of communication, and number of pages) and to print the accumulated communication details on paper when a prescribed operation is performed. In this way, the user can check the communication details on paper.

Recently, technologies have been proposed for enabling a user to view communication details of image data transferred in facsimile communications on a display of a terminal device that is connected to and capable of performing data communications with the communication device, rather than through a print media such as paper.

In Japanese patent application publication No. 2000-196799, for example, a communication device (electronic equipment) is configured to generate a web page (HTML file) displaying a list of communication details for facsimile communications (reception log) and having hyperlinks to received image data (received images) associated with the communication details. The communication device distributes this web page and image data via a network. With this technology, the user can check communication details on a web page displayed on a terminal device by accessing the above web page from a terminal device (network computer) connected to the communication device via a network. The user can also view content based on image data by linking to the image data from the web page.

However, the web page generated by the aforementioned communication device includes hyperlinks to image data unrelated to the communication details. Hence, even if the image data represents confidential information intended for specific users, for example, any user can access the above web page via the network and easily browse the content represented by the image data by linking to the data from the web page.

SUMMARY OF THE INVENTION

In view of the foregoing, it is an object of the present invention to provide a system for browsing communication details for facsimile communications and content represented by image data, and for restricting users from browsing the content represented by this image data when the content is confidential.

According to one aspect of the invention, there is provided a communication system that includes an image storing unit, a page generating unit, a page distributing unit, and an access determining unit. The image storing unit stores image data transmitted or received through facsimile communications. The page generating unit generates a list page, which is a web page displaying a list of communication details associated with the image data transmitted or received through the facsimile communications. The list of communication details includes hyperlinks to the associated image data stored in the image storing unit. The page distributing unit distributes via a network the list page generated by the page generating unit. The access determining unit determines whether to allow access to the image data associated with the communication details of the facsimile communication based on contents of the communication details. The page generating unit generates the list page having the hyperlinks only to the image data for which the access determining unit allows access.

According to another aspect of the invention, there is provided a communication system including a communication device and a terminal device connected to each other to be capable of performing data communications therebetween. In the communication system, the communication device includes an image storing unit, a page generating unit, and an access determining unit. The image storing unit stores image data transmitted or received through facsimile communications. The page generating unit generates a list page, which is a web page displaying a list of communication details associated with the image data transmitted or received through the facsimile communications. The list of communication details includes hyperlinks to the associated image data stored in the image storing unit. The access determining unit determines whether to allow access to the image data associated with the communication details of the facsimile communication based on contents of the communication details. The page generating unit generates the list page having the hyperlinks only to the image data for which the access determining unit allows access. The terminal unit connected to the communication device includes a page distributing unit that distributes via a network the list page generated by the page generating unit.

According to still another aspect of the invention, there is provided a communication system that includes a communication device and a terminal device connected to each other to be capable of performing data communications therebetween. In this communication system, the communication device includes an image storing unit, a first storage commanding unit, and an access determining unit. The image storing unit stores image data transmitted or received through facsimile communications. The first storage commanding unit stores image data transmitted or received through facsimile communications and communication details associated with the image data in the image storing unit. The access determining unit determines whether to allow access to the image data associated with the communication details of the facsimile communication based on contents of the communication details. The access determining unit determines whether to allow access to the image data when the image data is transmitted or received through facsimile communications. The first storage commanding unit stores only the communication details in the image storing unit when the access determining unit determines not to allow access based on the communication details and stores the communication details and the associated image data in the image storing unit when the access determining unit determines to allow access based on the communication details.

The terminal device used in combination with the communication device described above includes a page generating unit and a page distributing unit. The page generating unit generates a list page, which is a web page displaying a list of communication details associated with the image data transmitted or received through the facsimile communications. The list of communication details includes hyperlinks to the associated image data stored in the image storing unit. The page generating unit generates the list page having the hyperlinks only to the image data for which the access determining unit allows access. The page distributing unit distributes via a network the list page generated by the page generating unit.

According to yet another aspect of the invention, there are provided a communication device and a terminal device each being configured as described above.

According to another aspect of the invention, there is provided a storage medium that stores a program for controlling a communication device connected to and capable of performing data communications with a terminal device. The programs stored in the storage medium are:

a program of storing image data transmitted or received through facsimile communications in an image storing unit;

a program of generating a list page, the list page being a web page displaying a list of communication details associated with the image data transmitted or received through the facsimile communications, the list of communication details including hyperlinks to the associated image data stored in the image storing unit; and a program of determining whether to allow access to the image data associated with the communication details of the facsimile communication based on contents of the communication details; and a program of generating a list page having the hyperlinks only to the image data for which the access determining unit allows access.

According to still another aspect of the invention, there is provided a storage medium that stores a program for controlling a communication device connected to and capable of performing data communications with a terminal device. The programs stored in the storage medium are:

a program of storing image data transmitted or received through facsimile communications;

a program of storing image data transmitted or received through facsimile communications and communication details associated with the image data in an image storing unit provided in the communication device;

a program of determining whether to allow access to the image data associated with the communication details of the facsimile communication based on contents of the communication details:

a program of storing only the communication details in the image storing unit when access is not allowed based on the contents of the communication details; and a program of storing the communication details and the associated image data in the image storing unit when access is allowed based on the contents of the communication details.

According to further aspect of the invention, there is provided a storage medium that stores a program for controlling a terminal device connected to and capable of performing data communications with a communication device. The programs stored in the storage medium are:

a program of generating a first list page, the first list page being a web page displaying a list of communication details associated with image data transmitted or received through facsimile communications, the list of communication details including hyperlinks to the associated image data;

a program of generating a second list page having the hyperlinks only to the image data for which access is allowed; and a program of distributing via a network the second list page.

DESCRIPTION OF THE PREFERRED EMBODIMENTS

Next, preferred embodiments of the present invention will be described while referring to the accompanying drawings.

First Embodiment

Figure 1:
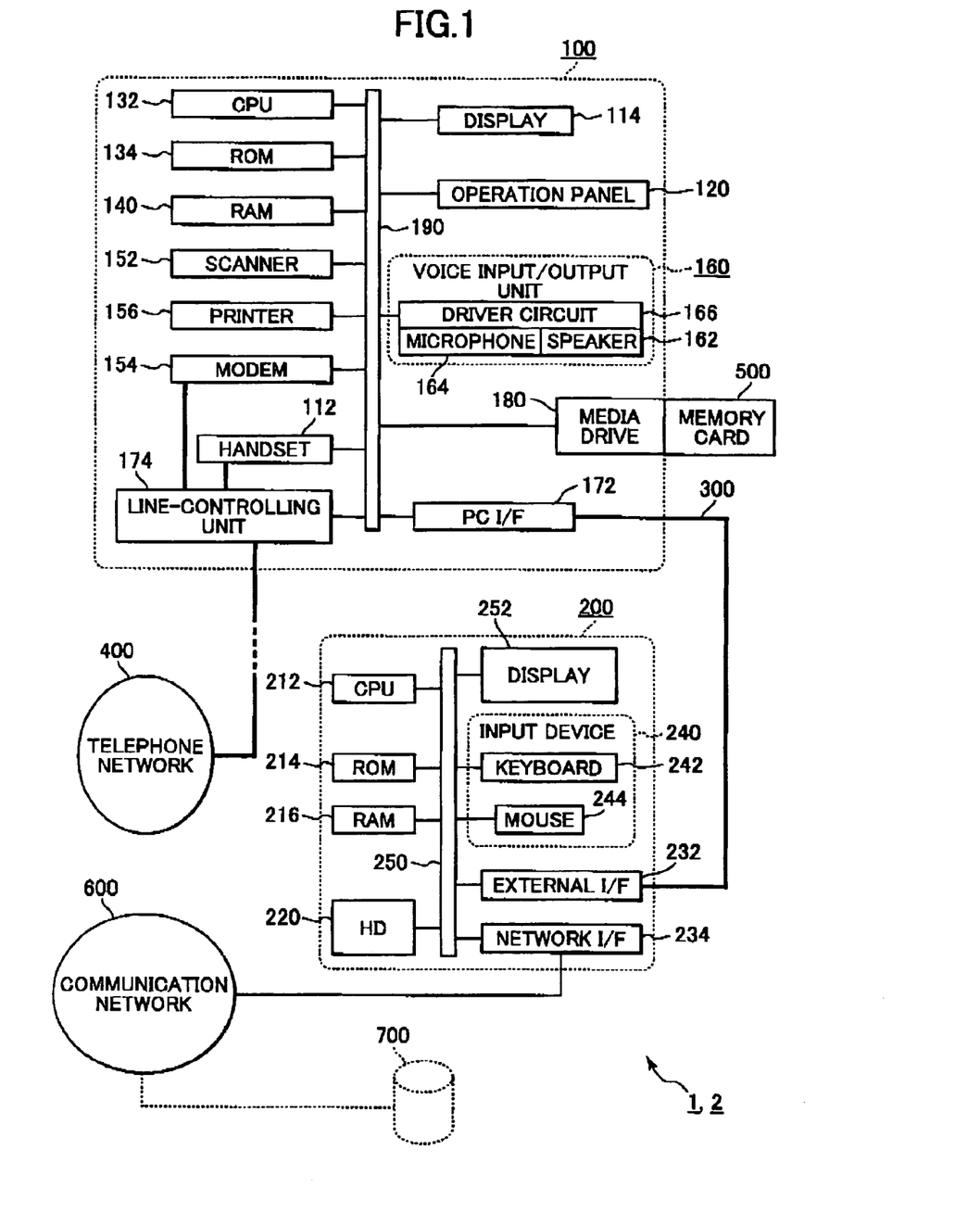
FIG. 1 is a block diagram showing the structure of a communication system according to a preferred embodiment of the present invention.

As shown in FIG. 1, a communication system 1 includes a multifunction device 100 and a personal computer (hereinafter referred to as PC) 200 that are connected to each other and capable of performing data communications via a communication cable 300.

The multifunction device 100 functions as a telephone terminal, a facsimile machine, a copier, a scanner, and the like. The multifunction device 100 includes a handset 112, a display panel 114, a control panel 120, a CPU 132, a ROM 134, a RAM 140, a scanning unit 152, a modem 154, a printing unit 156, a voice input/output unit 160, a PC interfacing unit (hereinafter referred to as PC I/F) 172, a circuit controlling unit 174, a media drive 180, and the like.

Figure 2:
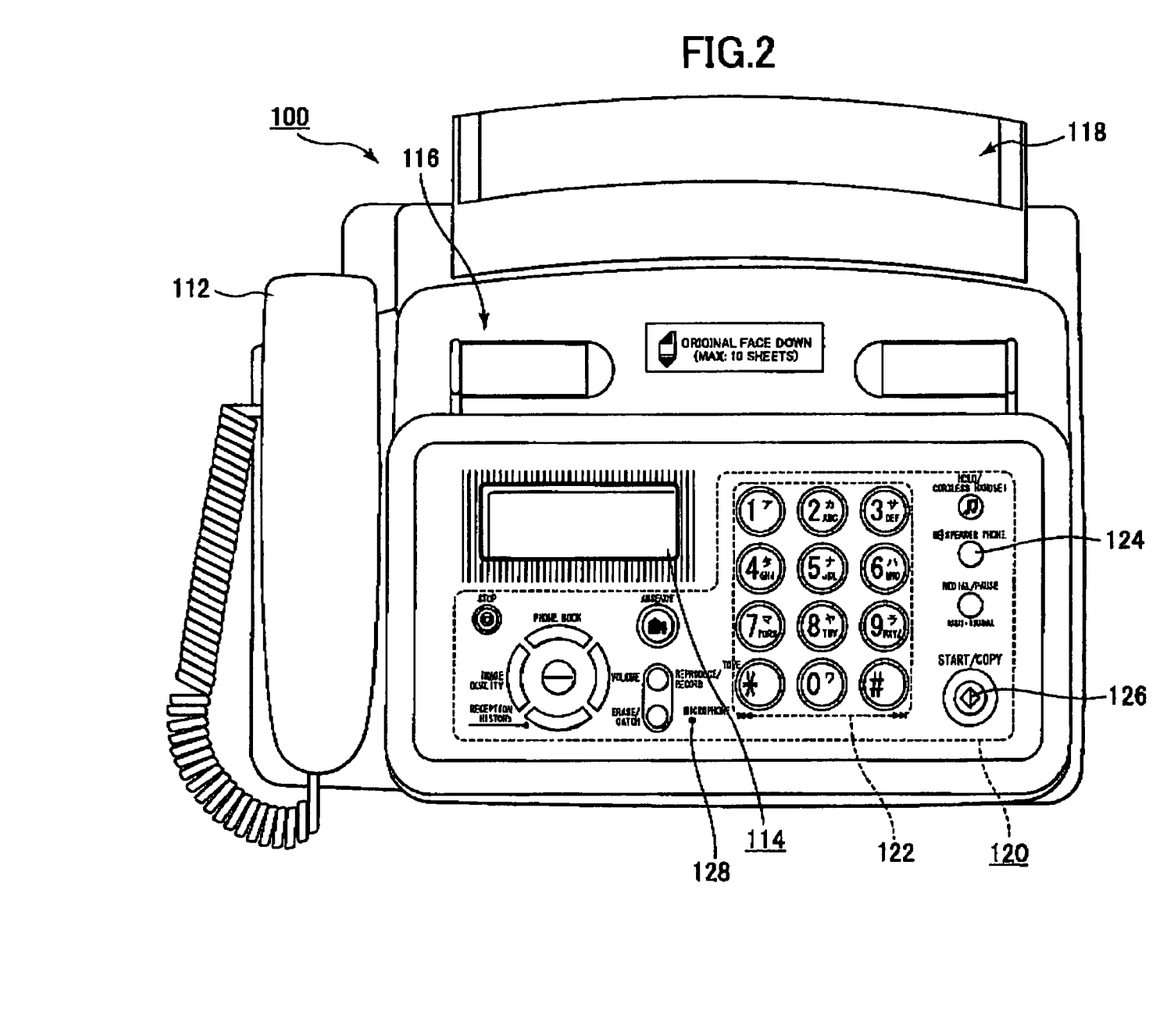
FIG. 2 is an explanatory diagram showing the appearance of a multifunction device according to a preferred embodiment of the present invention.

Here, the handset 112 is a transceiver mounted on the side of the multifunction device 100, as shown in FIG. 2, and is used when removed from the body of the multifunction device 100. The display panel 114 is provided on the top of the multifunction device 100 for receiving commands from the CPU 132 and displaying various data. The control panel 120 is also provided on the top of the multifunction device 100 and includes a plurality of input buttons 122 for inputting alphanumeric characters and symbols, a speakerphone button 124 for implementing a hands-free call with the voice input/output unit 160, a start button 126 for initiating execution of the various functions, and the like.

The CPU 132 controls overall operations of the multifunction device 100 by transmitting commands (control signals) via a bus 190 to the various components of the multifunction device 100 according to a procedure directed by a computer program that is stored in the ROM 134.

Part of the storage area in the RAM 140 is a shared area that the PC 200 connected to the multifunction device 100 can recognize as an external storage device (virtual drive) connected to the PC 200 itself. Accordingly, the PC 200 can recognize the shared area as a storage area that can be accessed (to store and delete data) by a file system, which is part of a function provided standard in an OS (operating system). This shared area has a tree-like folder structure (also called a directory) for sorting and storing data files in folders.

In a facsimile communication process described later (see FIG. 3), the scanning unit 152 receives commands from the CPU 132 and scans images from paper loaded in a prescribed scanning position 116 (see FIG. 2) to generate image data based on these images. The image data is encoded and modulated by the modem 154 to generate image signals that can be transferred to a telephone network 400 and subsequently outputs the image signals to the telephone network 400 via the circuit controlling unit 174.

In the facsimile communication process described later (see FIG. 3), the printing unit 156 receives commands from the CPU 132 and prints images based on image data on paper loaded in a prescribed paper feeding position 118 (see FIG. 2). Image data on which printing of the image is based might be generated, for example, from image signals inputted from the telephone network 400 via the circuit controlling unit 174 that are demodulated and decoded by the modem 154.

The voice input/output unit 160 includes a speaker 162, a microphone 164, and a drive circuit 166 for driving the speaker 162 and microphone 164. In addition to outputting voice from the speaker 162 based on various voice signals, the voice input/output unit 160 can be used for performing a hands-free call by controlling the speaker 162 and microphone 164 to function as a transceiver. The microphone 164 of the voice input/output unit 160 is mounted on the underside of the control panel 120 and positioned below a hole 128 formed therein (see FIG. 2). Voice is inputted into the microphone 164 via the hole 128.

The PC I/F 172 is an interface for connecting the multifunction device 100 to the PC 200 via the communication cable 300, by which data communications is made possible between the multifunction device 100 and PC 200.

The circuit controlling unit 174 inputs various signals from the telephone network 400 and outputs signals to the telephone network 400. The circuit controlling unit 174 also receives commands from the CPU 132 and sets the transmission path including a transmission destination and a transmission source for signals inputted from and outputted to the telephone network 400.

When performing an oft-hook operation by removing the handset 112 from the body of the multifunction device 100 or by pressing the speakerphone button 124 on the control panel 120, the transmission path for the destination and source of signals inputted from and outputted to the telephone network 400 is set to a path from the circuit controlling unit 174 to the handset 112 or the voice input/output unit 160, enabling voice signals to be transmitted along this path. The transmission path established in this way is disconnected upon execution of an on-hook operation in which the handset 112 is returned to the body of the multifunction device 100 or the speakerphone button 124 is pressed a second time, thereby preventing voice signals from being transmitted on the path.

If a series of operations is performed while paper to be scanned is set in the scanning position 116 in which operations an identification number for a transmission destination (a telephone number in the present embodiment) is inputted by the input buttons 122 on the control panel 120 and subsequently the start button 126 is pressed (hereinafter referred to as a fax transmission operation), or when the input of image signals is initiated on the telephone network 400 end, the path to the modem 154 is set as the transmission path, enabling the transmission of image signals along this path. When the output of image signals by the modem 154 ends or when input of image signals from the telephone network 400 ends, this transmission path is disconnected preventing further transmission of image signals on the path (see the facsimile communication process described later with reference to FIG. 3).

The media drive 180 accepts mounting of a memory card 500 and can read data from a mounted memory card 500 or record data thereon. "Memory card" in the present embodiment refers to such media as CompactFlash (registered trademark), SmartMedia (registered trademark), Memory Stick (registered trademark), MultiMediaCard, and SD Memory Card.

The PC 200 includes a CPU 212, a ROM 214, a RAM 216, a hard disk (hereinafter abbreviated as HD) 220, an external interfacing unit (hereinafter referred to as an external I/F) 232, a network interfaces unit (hereinafter referred to as a network I/F) 234, an input unit 240, a display 252, and the like connected to one another via a bus 250.

Of these, the HD 220 stores computer programs described later for executing a log acquisition process (FIG. 4), for directing the PC 200 to function as a web server in order to distribute web pages via a communication network 600, and the like.

The external I/F 232 is an interface for connecting the PC 200 to the multifunction device 100 via the communication cable 300, by which data communications is enabled between the PC 200 and the multifunction device 100. The network I/F 234 is an interface for connecting the PC 200 to the communication network 600, which is a local area network (LAN) in the preferred embodiment. The inputting unit 240 is an input device including a keyboard 242 and a mouse 244.

<Facsimile Communication Process Executed by the CPU 132 of the Multifunction Device 100>

Next, steps in a facsimile communication process executed by the CPU 132 of the multifunction device 100 will be described with reference to FIG. 3. This process begins when a fax transmission operation is performed or when image signals are initially input from the telephone network 400 via the circuit controlling unit 174.

First, a path connecting the modem 154 and the telephone network 400 is established in S110 as the signal transmission path. In this process, the CPU 132 controls the circuit controlling unit 174 to establish a signal transmission path between the modem 154 and the telephone network 400, enabling transmission of image signals along the path.

Next, communication of image signals is performed in S120. In this process, if the facsimile communication process was begun by the user pressing the start button 126, the scanning unit 152 scans the image to generate image data. Next, the modem 154 encodes and modulates the image data to generate image signals that can be transferred via the telephone network 400. The modem 154 outputs these image signals to the circuit controlling unit 174, enabling the image signals to be outputted to the telephone network 400 (transmission destination). However, if the facsimile communication process was begun due to the reception of image signals, first the modem 154 demodulates and decodes image signals sequentially inputted from the telephone network 400 via the circuit controlling unit 174 to generate image data. Next, the printing unit 156 prints an image based on this image data. In this way, an image based on image signals inputted from the telephone network 400 is printed on paper.

Next, the transmission path established in S110 is cancelled in S130. In this process, the CPU 132 controls the circuit controlling unit 174 to cancel the transmission path connecting the modem 154 to the telephone network 400, preventing the transmission of image signals along this path.

In S140 the CPU 132 determines the party with which image signals are being communicated. In this process, the CPU 132 determines whether the party with which image signals are being communicated is a party with which image data based on image signals may be recorded, based on a recording determination table stored in the RAM 140 (a storage area other than the shared area). Identification numbers are registered in this recording determination table for communication parties for which image data may not be saved (communication parties having confidentiality). The CPU 132 determines that image data may be saved for communication parties whose identification numbers are not registered in this table. The "party with which image signals are being communicated" in S140 is the party whose identification number was inputted via the input buttons 122 prior to pressing the start button 126 (transmission destination) when the facsimile communication process was initiated by pressing the start button 126. However, if the facsimile communication process was initiated by the reception of image signals, the communication party corresponds to the identification number that is transmitted from the telephone network 400 end together with the image signals (transmission source).

If the party with which image signals are being communicated in S140 is one for which image data based on the image signals may be saved (S140: YES), then in S150 the CPU 132 stores image data based on the image signals transferred in S120 in the shared area of the RAM 140. In this process, if the facsimile communication process was initiated by pressing the start button 126, the image data generated by the scanning unit 152 in S120 is converted to a prescribed data format (the JPEG (Joint Photographic Experts Group) format in the preferred embodiment) and the resulting image data is stored in the shared area of the RAM 140. However, if the facsimile communication process was initiated by the reception of image signals, the image data, demodulated and decoded by the modem 154 in S120, is converted to a prescribed data format (JPEG format) and the resulting image data is stored in the shared area of the RAM 140. The filename of the image data is set to a numerical string formed by combining the numbers in the communication date with the numbers in the communication time. For example, if the communication date is "2003.03.11" and the communication time is "10:20", then the filename is set to "200303111020."

In S160 log data indicating details of the communication performed in S120 is stored in the shared area of the RAM 140. The log data specifies the communication date, communication time, communication type indicating either transmission or reception, identification number of the communication party, duration of the communication, amount of data transferred (number of pages in the preferred embodiment), communication results indicating whether the communication was a success or a failure, and the filename of the image data stored in S150.

However, if the party with which image signals were communicated is not a party for which image data based on the image signals may be saved (S140: NO), then log data indicating details of the communication performed in S120 is stored in the shared area of the RAM 140 in S170. This log data is identical to that saved in S160, except that a filename for the image data is not specified since the process of S150 for saving the image data is not performed.

After completing the process of S170 or S160, the facsimile communication process ends.

<Log Acquisition Process Executed by the CPU 212 of the PC 200>

Next, steps in a log acquisition process executed by the CPU 212 of the PC 200 will be described with reference to FIG. 4. This process is repeatedly executed while the PC 200 is operating.

In the beginning, the CPU 212 monitors the shared area of the RAM 140 and waits until log data is stored therein (S210: NO). When log data is stored in the shared area of the RAM 140 (S210: YES), the CPU 212 determines in S220 whether a filename for image data can be identified from the log data. Here, the filename of image data can be identified if the log data was stored in the shared area of the RAM 140 in S160 of FIG. 3, but cannot be identified if the log data was stored in S170 of FIG. 3.

If the filename for image data can be identified in S220 (S220: YES), then the CPU 212 reads image data for the filename from the shared area of the RAM 140 and stores this image data in the HD 220 in S230. In S240 the CPU 212 deletes the image data, read from the RAM 140 in S230, from the RAM 140. After completing the process of S240, or if a filename for image data cannot be identified in S220 (S220: NO), then in S250 the CPU 212 reads the log data stored in S210 and stores the parameters identified by this log data in a log table. The log table is a data table stored on the HD 220. As shown in FIG. 5, parameters such as communication date, communication time, communication type, identification number of the communication party (from/to), time required for the communication (duration), amount of data transferred (pages), communication result, and filename are entered in the log table in association with each other. Hence, the process of S250 records parameters corresponding to the details identified by the log data. Since a log table does not exist on the HD 220 when the process of S250 is performed for the first time, a log table must first be created before recording the parameters.

In S260 the CPU 212 deletes the log data read from the RAM 140 in S250 from the RAM 140. In S270 the CPU 212 generates a log page, i.e., a web page for publishing a list of communication details based on the log table. In this process, the log table is expressed using table tags (<table> . . . </table>) in the HTML (HyperText Markup Language) description. The CPU 212 generates a web page provided with a hyperlink to the image data of this filename as a log page and stores the web page on the HD 220. The hyperlink is provided using an anchor tag (<a href-"XXXX">YYYY</a>; where "XXXX" is the pathname indicating the storage area for the image data and "YYYY" is the filename of the image data). If another terminal device connected to the communication network 600 requests a log page generated as described above, the PC 200 transfers this log page to the terminal device that requested the data. Since the log page was generated with a specific filename, the terminal device connected to the communication network 600 issues a request to the PC 200 for the log page based on this filename. After completing the process of S270, the CPU 212 returns to S210.

Figure 3:
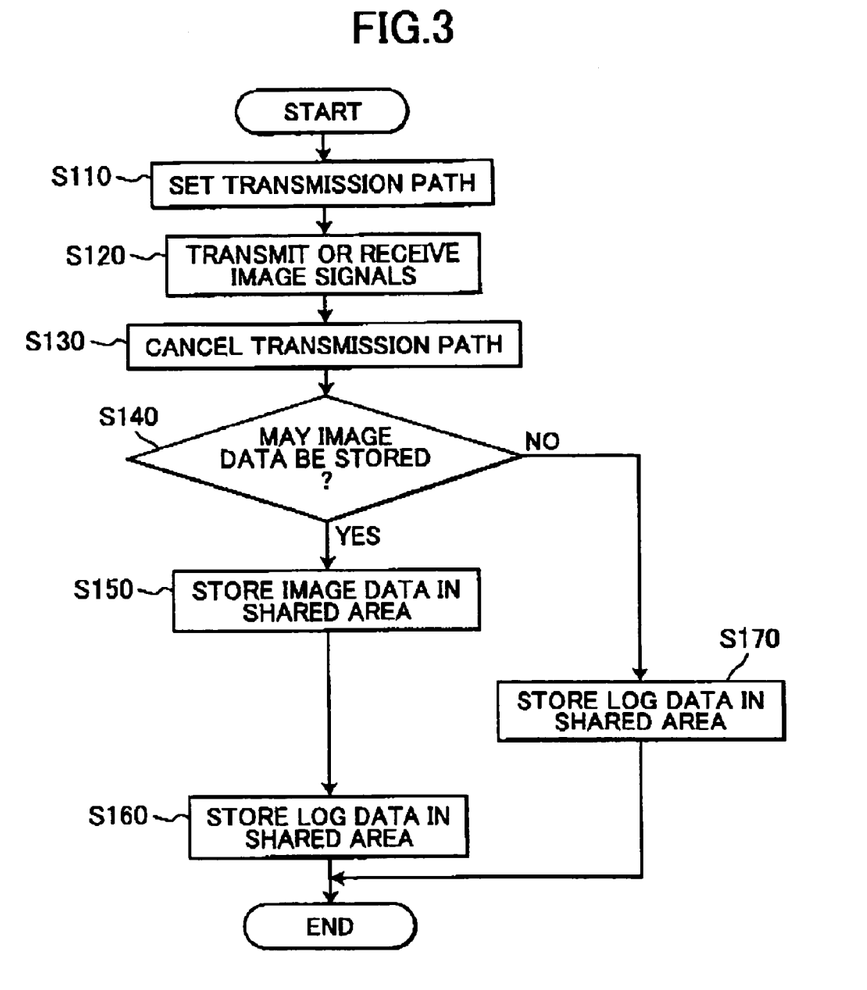
FIG. 3 is a flowchart showing steps in a facsimile communication process according to a first embodiment.
Figure 4:
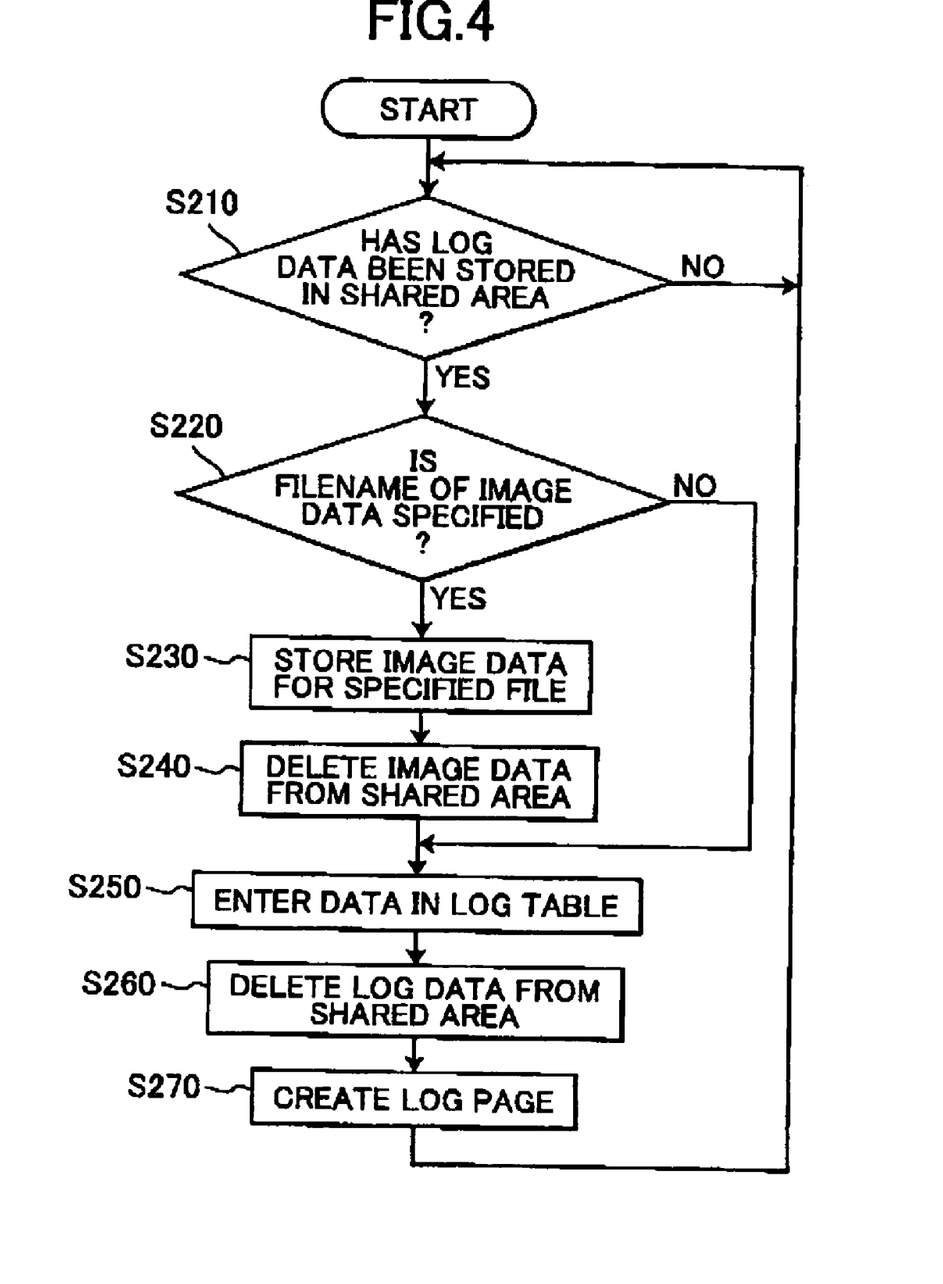
FIG. 4 is a flowchart showing steps in a log acquisition process according to the first embodiment.
Figure 5:
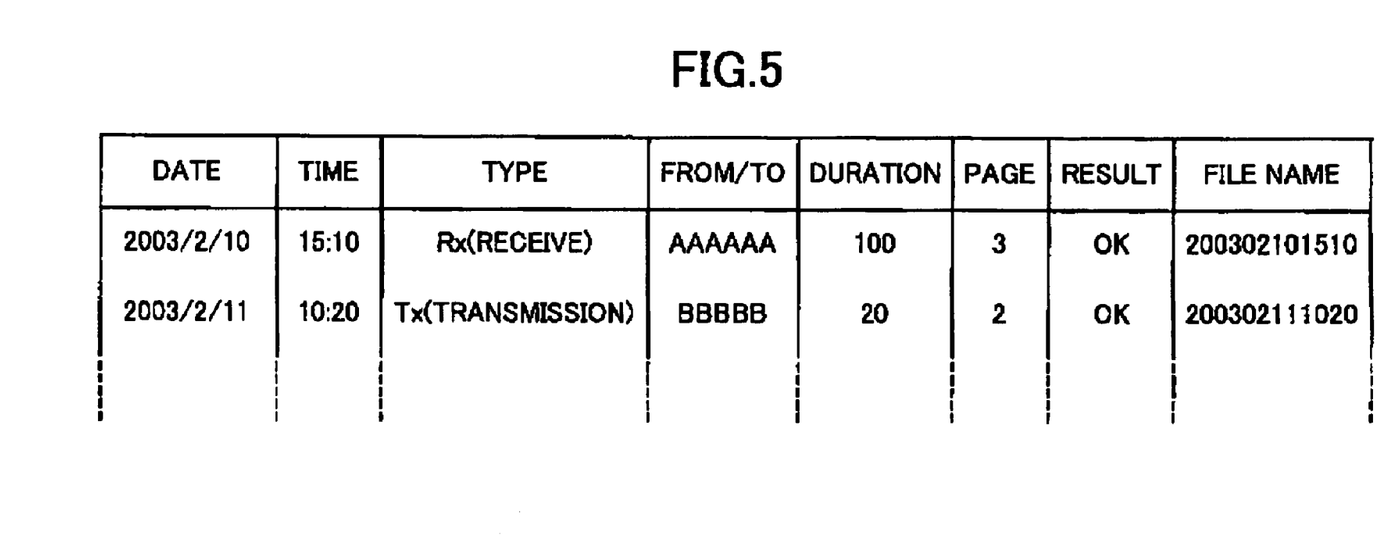
FIG. 5 is an explanatory diagram showing the data construction of a log table.

With the communication system 1 having this construction, the PC 200 can generate a log page having hyperlinks to image data in the process of S270 in FIG. 4. The hyperlinks provided in the log page are links to image data for the filenames recorded in the log table. In S250 parameters identified by the log data stored in the shared area of the RAM 140 are recorded in the log table. However, the log data includes data identifying a filename only when the multifunction device 100 determines in S140 of FIG. 3 that the image data may be saved. Therefore, in S270 of FIG. 4 the PC 200 can generate a log page having hyperlinks only to image data that the multifunction device 100 determines may be saved, that is, image data that can be published (can be accessed) via the communication network 600.

Further, in S140 of FIG. 3, the multifunction device 100 can determine whether image data may be recorded, i.e., made public, based on the communication party (transmission destination or transmission source). The multifunction device 100 determines whether image data may be saved in the process of S140 by determining whether the identification number of the communication party is stored in the recording determination table. Hence, by storing identification numbers of communication parties that transmit or receive image data having confidential content in the recording determination table, the PC 200 can generate a log page that does not include hyperlinks to image data likely to contain confidential content. Hence, users cannot link to image data likely to contain sensitive content from the log page and, therefore, cannot view content based on the image data.

Further, if the multifunction device 100 determines in S140 of FIG. 3 that image data may be saved, the image data is saved together with the log data in the shared area of the RAM 140. However, if the multifunction device 100 determines that the image data may not be saved, then only the log data is saved. Since image data is not saved when the multifunction device 100 determines that the communication content is such that the image data may not be saved, there is no need to identify whether image data may be saved. Beginning from the process of S220 in FIG. 4, the PC 200 simply generates a log page having hyperlinks to image data whose filenames are identified in the log data. In this way it is possible to generate a log page that includes only hyperlinks to image data that can be made public via the communication network 600.

Further, since the PC 200 can recognize the shared area of the RAM 140 in the multifunction device 100 as an external storage device connected to the PC 200 itself, the PC 200 can easily access (store data in and delete data from) this shared area.

Further, when log data and image data are stored in the shared area in the processes beginning from S210 of FIG. 4, the CPU 212 can read this data and store or record the data on the HD 220 of the PC 200. In this way, the log data and image data need only be stored in the shared area of the RAM 140 on the multifunction device 100 end, and there is no need to execute a special process to transfer this data to the PC 200 end. Thus image data and log data indicating details of facsimile communications with the multifunction device 100 can be stored and managed on the PC 200 end.

Further, immediately after the log data and image data are stored in the RAM 140 during the facsimile communication process of FIG. 30 (S150-S170), this data is read and deleted during the log acquisition process of FIG. 4 performed on the PC 200 end (S210-S260). Accordingly, log data and image data for facsimile communications can be saved and managed on the PC 200 end while effectively using a small storage capacity in the shared area of the RAM 140, provided that the RAM 140 has a sufficient storage capacity for storing an amount of data thought to be generated in a single facsimile communication process.

Second Embodiment

A communication system 2 has nearly an identical construction as the communication system 1 of the first embodiment. Since only a portion of the constructions and the processing means differ, only these differing points will be described.

The communication system 2 includes the multifunction device 100 and the PC 200 that are connected and capable of performing data communications with each other via the communication cable 300. The PC 200 is also connected to and capable of performing data communications with a server 700 (indicated by the dotted line in FIG. 1) via the communication network 600. Unlike in the first embodiment, the HD 220 of the PC 200 in the second embodiment does not store a program for directing the PC 200 to function as a web server. Further the server 700 is a computer system that functions as a web server well known in the art.

<Facsimile Communication Process Executed by the CPU 132 of the Multifunction Device 100>

Next, steps in a facsimile communication process executed by the CPU 132 of the multifunction device 100 will be described with reference to FIG. 6. This process begins when a fax transmission operation is performed or when image signals are first inputted from the telephone network 400 via the circuit controlling unit 174.

First, in S310 the CPU 132 sets the path connecting the modem 154 and the telephone network 400 as the signal transmission path. This process is identical to the process of S110 in FIG. 3.

In S320 the CPU 132 transmits or receives image signals. This process is identical to the process of S120 in FIG. 3. In S330 the CPU 132 cancels the transmission path set in S310. This process is identical to S130 in FIG. 3. In S340 the CPU 132 determines the party with which image signals were communicated. This process is identical to S140 in FIG. 3.

If the party with which image signals were communicated is a party for which image-data based on image signals may be stored (S340: YES), then in S350 the CPU 132 stores the image data based on image signals communicated in S320 in a first folder provided in the shared area of the RAM 140. In this process, as in S150 of FIG. 3, the image data is converted to a prescribed data format (JPEG format) and the resulting image data is stored in the first folder of the shared area. The "first folder" is a folder that is created in the RAM 140 in advance.

In S360 the CPU 132 stores log data for the details of communications performed in S320 in the first folder of the shared area. In this process, as in S160 of FIG. 3, data stored in the first folder located in the shared area of the RAM 140 can identify the communication date, communication time, communication type, identification number, duration of communication, amount of data transferred, communication result, and filename for the image data stored in S350.

However, if the party with which image signals were communicated is not a party for which image data based on the image signals may be recorded (S340: NO), then image data based on the image signals transferred in S320 is stored in the second folder in the shared area in S370. In this process, as in the process of S350, the CPU 132 converts the image data to a prescribed data format (JPEG format) and stores the resulting image data in the second folder provided in the shared area of the RAM 140. Here, the "second folder" has been created in the RAM 140 in advance.

In S380 the CPU 132 stores log data for details of the communications performed in S320 in the second folder of the shared area. This process is identical to the process in S360, except that the log data is stored in the second folder provided in the shared area of the RAM 140.

After completing the process in S380 or S360, the CPU 132 ends the facsimile communication process.

<Log Acquisition Process Executed by the CPU 212 of the PC 200>

Next, steps in a log acquisition process executed by the CPU 212 of the PC 200 will be described with reference to FIG. 7. This process is executed repeatedly while the PC 200 is operating.

First, in S402 the CPU 212 creates a public folder and a non-public folder on the HD 220. The "public folder" serves to store various data required for generating a public log page in subsequent processes. The "non-public folder" serves to store various data required for generating a non-public log page in subsequent processes.

Next, the CPU 212 monitors the shared area in the RAM 140 and waits for log data to be stored therein (S410: No). This process is identical to the process of S210 in FIG. 4.

When log data is stored in the shared area of the RAM 140 (S410: YES), then the CPU 212 determines in S420 whether the log data was stored in the first folder or the second folder. If log data was stored in the first folder (S420: YES), then in S430 the CPU 212 reads image data from the shared area (within the first folder) of the RAM 140 based on a filename identified by this log data and stores the image data in the public folder created in S402.

In S440 the CPU 212 reads the log data stored in S410 and records the various parameters identified by this log data in a public log table. As with the log table created in S250 of FIG. 4 (see FIG. 5), the "public log table" is a data table stored on the HD 220. The process in S440 enters parameters corresponding to each of the communication details identified by the log data in this public log table. Since the public log table has not yet been created or stored on the HD 220 when the process of S440 is executed for the first time in the log acquisition process, the public log table must be created prior to entering the parameters.

In S450 the CPU 212 generates a public log page, which is a web page for publishing a list of communication details based on the public log table. In this process, as in S270 of FIG. 4, the CPU 212 generates a public log page and stores the log page on the HD 220.

In S460 the CPU 212 transfers (uploads) the public log page generated in S450 to the server 700. The public log page is transferred to the server 700 in this process using a prescribed communication protocol. When the server 700 subsequently receives a request from another terminal device connected to the communication network 600 for distribution of the public log page transferred from the PC 200, the server 700 can distribute this public log page to the terminal device at the source of the request. Since the public log page is created with a specific filename, a terminal device connected to the communication network 600 can issue a request to the server 700 for distribution of the public log page based on this filename.

In S470 the CPU 212 deletes the image data read from the RAM 140 (first folder in the shared area) of the multifunction device 100 in S430 and log data read from the RAM 140 (first folder of the shared area) in S440 from the RAM 140. After completing the process of S470, the CPU 212 returns to S410.

Further, if log data is stored in the second folder in S420 described above (S420: NO), then in S480 the CPU 212 reads image data from the shared area (within the second folder) of the RAM 140 based on a filename identified by this log data and stores the image data in the non-public folder created in S402.

In S490 the CPU 212 reads the log data stored in S410 and enters various parameters identified by this log data in a non-public log table. As with the log table generated in S440, the "non-public log table" is a data table stored on the HD 220. The process of S490 records parameters corresponding to the various details identified by this log data. Since the non-public log table has not yet been stored on the HD 220 when the process of S490 is first executed in the log acquisition process, the non-public log table must first be created before entering the parameters.

In S500 the CPU 212 creates a non-public log page, which is a web page for publishing with restrictions a list of communication details based on the non-public log table. In this process, as in the process of S450, the CPU 212 generates a non-public log page and stores this log page on the HD 220. Unlike the public log page, the non-public log page generated above is stored only on the HD 220. Accordingly, only the user of the PC 200 can view the non-public log page using a web browser.

In S510 the CPU 212 deletes the image data read from the RAM 140 (the second folder in the shared area) in S480 and the log data read from the same RAM 140 (the second folder of the shared area) in S490 from the 140. After completing the process of S510, the CPU 212 returns to S410.

The communication system 2 of the second embodiment having the construction described above can achieve the following effects owing to differences in construction from that of the first embodiment.

Figure 6:
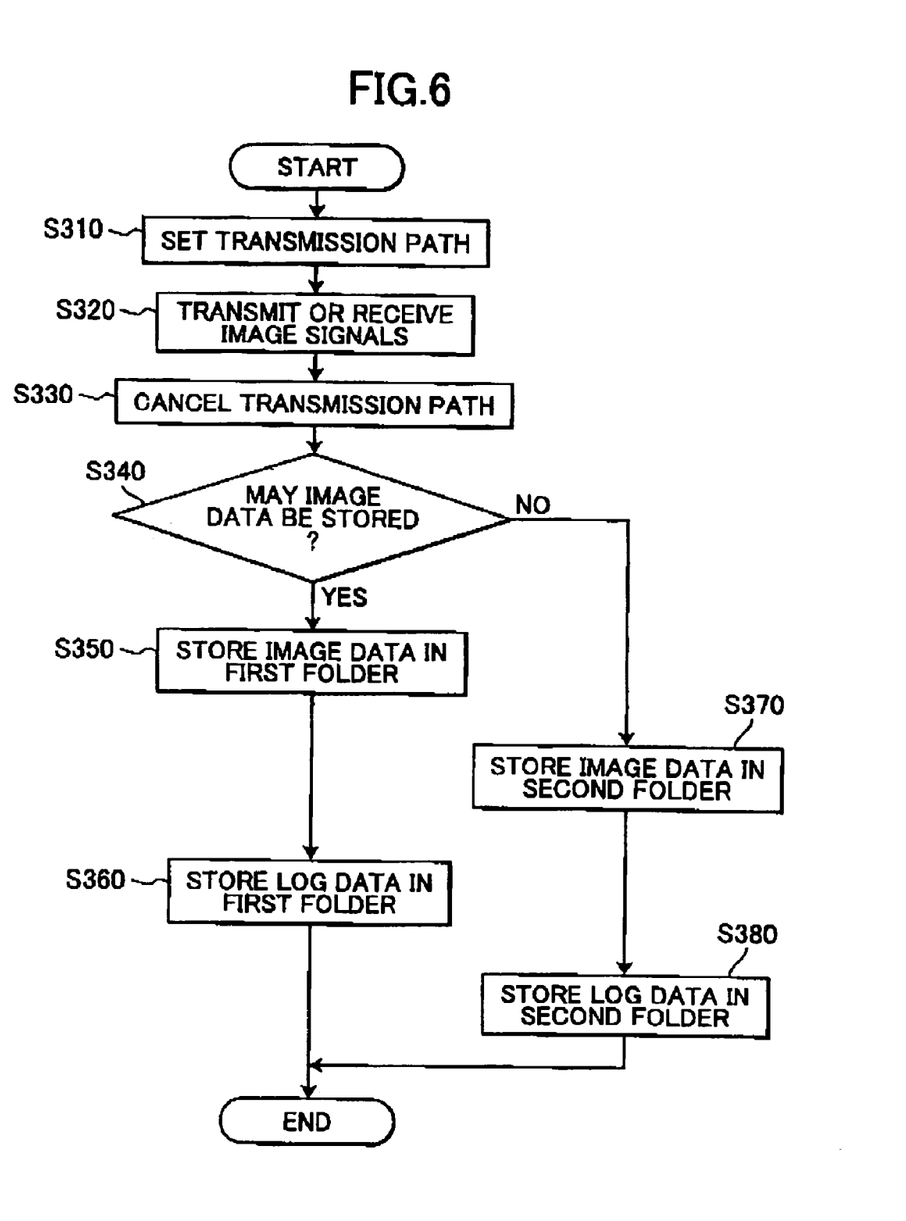
FIG. 6 is a flowchart showing steps in a facsimile communication process according to a second embodiment.

In the communication system 2 having this construction, the multifunction device 100 stores image data transmitted or received through facsimile communications and log data indicating details of the communication in one of two different folders and in association with each other (S350-S380 of FIG. 6). Hence, when log data is stored in the RAM 140 of the multifunction device 100, the PC 200 can create a different log page according to the folder in which the log data was stored in the processes beginning from S430 in FIG. 7. That is, the PC 200 can create a public log page having hyperlinks to image data that can be published unconditionally via the communication network 600 or a non-public log page having hyperlinks to image data that can only be published conditionally. Accordingly, in the processes beginning from S340, the multifunction device 100 uses folders to indicate whether image data can be published unconditionally via the communication network 600 or whether the image data can only be published conditionally. The PC 200 then determines whether the image data is to be published conditionally or unconditionally via the communication network 600 based on the folder in which the log data was stored, and can subsequently generate a suitable log page.

Figure 7:
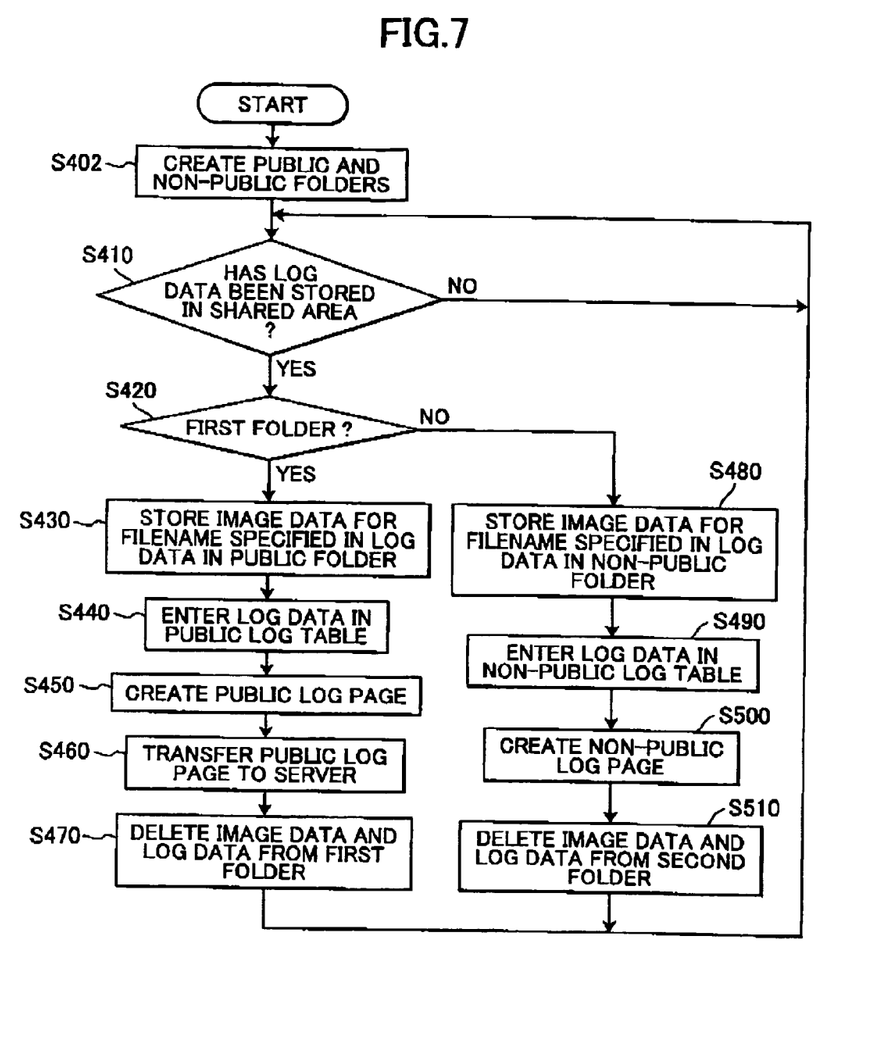
FIG. 7 is a flowchart showing steps in a log acquisition process according to the second embodiment.

Further, in S450 and S500 of FIG. 7, the PC 200 can create a public log page having hyperlinks to image data that can be published unconditionally and a non-public log page having hyperlinks to image data that can only be published conditionally. Since the non-public log pages are not transferred to the server 700, these pages can only be viewed from the PC 200. In this way, it is possible to restrict the viewing of content represented by image data that can only be published conditionally. More specifically, unless the PC 200 is provided with a web server function and is capable of distributing a non-public log page and the user of the PC 200 performs an operation to transfer the non-public log page to the server 700, users of other terminal devices connected to the communication network 600 cannot access this non-public log data, thereby preventing users other than the user of the PC 200 from viewing the non-public log data.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, processes shown in the flowcharts are executed by a computer system including the CPU 132 in the multifunction device 100 and the CPU 212 in the PC 200. However, part or all of these processes may be executed by a separate computer system connected to the multifunction device 100 and the PC 200 via wired or wireless signal transmission paths.

Further, in the multifunction device 100 of the embodiments described above, processes shown in the flowcharts are executed according to a computer program stored in the ROM 134. However, this computer program may instead be stored on the memory card 500. In this case, the processes shown in the flowcharts may be executed according to the computer program stored on the memory card 500 when the memory card 500 is mounted in the media drive 180.

Further, in the PC 200 of the embodiments described above, the processes shown in the flowcharts are executed according to a computer program stored in the ROM 214 or on the HD 220. However, if the PC 200 is configured to perform data input and output with a storage medium, such as a floppy disk or a memory card, the PC 200 may execute the processes shown in the flowcharts based on the computer program stored on the storage medium.

Further, the communication system in the embodiments described above includes the multifunction device 100 and the PC 200 (and the server 700), but may instead be configured of a single device.

Further, while the communication system in the embodiments described above is configured of only the multifunction device 100 and the PC 200 (and the server 700), a portion of the functions implemented by the multifunction device 100 or the PC 200 (or the server 700) may instead be implemented by another device connected to and capable of performing data communications with these devices.

Further, the telephone network 400 in the embodiments described above may be a public switched telephone network (PSTN) or an IP telephone network.

Further, in the embodiments described above, image data and log data are exchanged between the multifunction device 100 and the PC 200 using the shared area in the RAM 140 of the multifunction device 100. However, this exchange of data may also be performed through the memory card 500 mounted in the media drive 180. In this case, the "shared area of the RAM 140" description in the preferred embodiments should be replaced by the "memory card 500 mounted in the media drive 180."

Further, in the embodiments described above, the CPU 132 determines in S140 of FIG. 3 and S340 of FIG. 6 whether image data may be recorded based on whether an identification number for the part with which the image signals are communicated is entered in the recording determination table. However, other data besides the recording determination table or other methods may be used in S140 and S340 to determine whether image data can be recorded.

For example, the CPU 132 may determine in S140, and S340 that image data may not be recorded when the date and time of the communication is a specific date and time. With this construction, the CPU 132 can determine whether to record image data based on the date and time of communications indicated in the communication details. To achieve this, with the first embodiment, the date and time for transferring image data representing confidential content is preset (data indicating the date and time is stored) and the CPU 132 determines in S140 that image data is not to be stored when the image data was transferred at the preset date and time in the process of S120. With this construction, log data identifies the filename of image data only when the image data was transferred at a date and time other than the preset date and time used to indicate confidential content. Accordingly, in S270 of FIG. 4 the PC 200 can create a log page having a hyperlink to image data that may be made public via the communication network 600.

Figure 8:
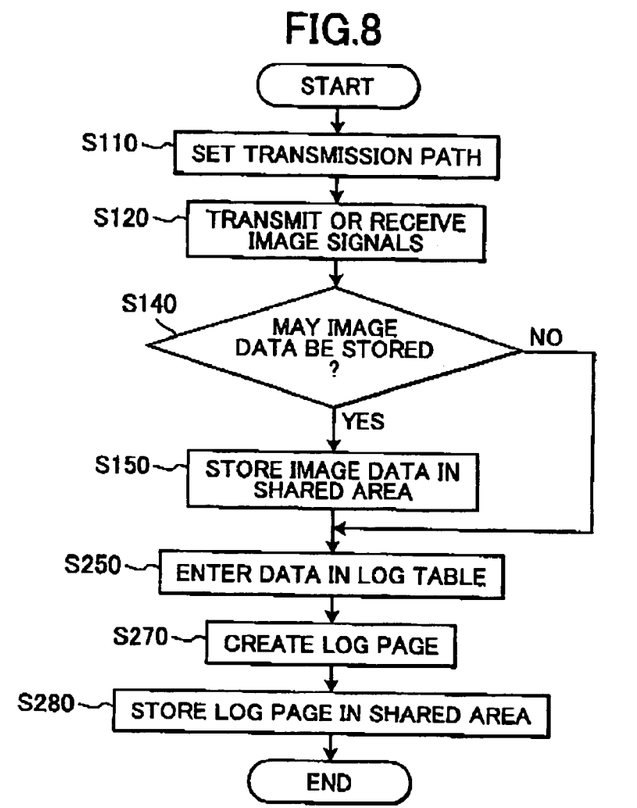
FIG. 8 is a flowchart showing steps in a facsimile communication process according to a modification of the embodiments.
Figure 9:
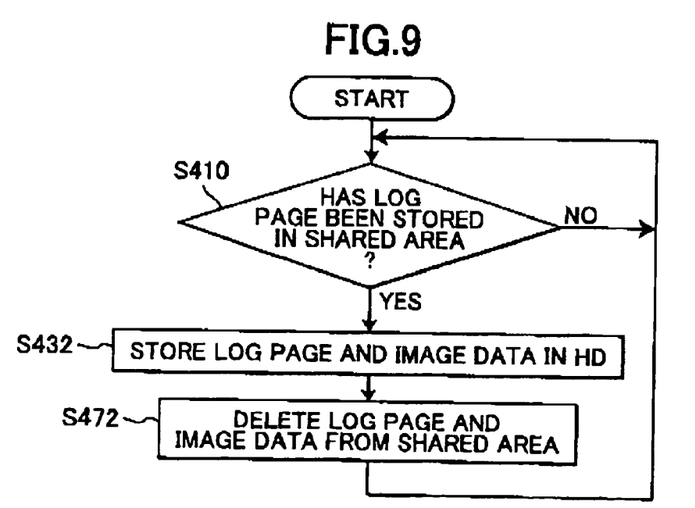
FIG. 9 is a flowchart showing steps in a log page acquisition process according to the modification of the embodiments.

Further, the first embodiment described above is configured such that a log page is created on the 200 end (see FIGS. 4 and 7). However, the log page may also be created on the multifunction device 100 end. In this case, shown in FIG. 8, the multifunction device 100 does not perform the processes of S160 and S170 in the facsimile communication process of FIG. 3. After completing the process of S150 or when the CPU 132 determines that the image data may not be stored in the process of S140, the processes of S250 and S270 in FIG. 4 are executed. Subsequently, in S280 the CPU 132 stores the log page generated in S270 in the shared area of the RAM 140. In a log page acquisition process shown in FIG. 9 and used in place of the log acquisition process of FIG. 4, the PC 200 waits until a log page has been stored in the shared area of the RAM 140 (S410: NO). When a log page has been stored in the shared area (S410: YES), then in S432 the CPU 212 reads this log page and image data from the shared area and stores this data on the HD 220. In S472 the CPU 212 deletes the log page and image data read in S420 from the shared area of the RAM 140 and subsequently returns to S410.

Further, in the second embodiment described above, the CPU 132 determines in S340 of FIG. 6 whether image data may be stored based on whether an identification number for the party with which the image data was communicated is recorded in the recording determination table. However, it is also possible to preset a date and time at which image data representing confidential content is transferred and to determine in S340 that image data should not be stored if the image data has transferred at the preset date and time in S320. In this case, log data that was not transferred at the preset date and time used to indicate confidential content is stored in the first folder, while log data transferred at the preset date and time is stored in the second folder. Accordingly, in the processes of S450 and S500 in FIG. 7, the PC 200 can create a public log page having hyperlinks to image data that may be published unconditionally via the communication network 600 and a non-public log page having hyperlinks to image data that must be published with conditions.

Further, in the second embodiment described above, folders are used to identify whether image data may be published unconditionally via the communication network 600 or may only be published with conditions (FIGS. 6 and 7). However, the method of identifying the type of image data is not particularly limited to this construction.

Figure 10:
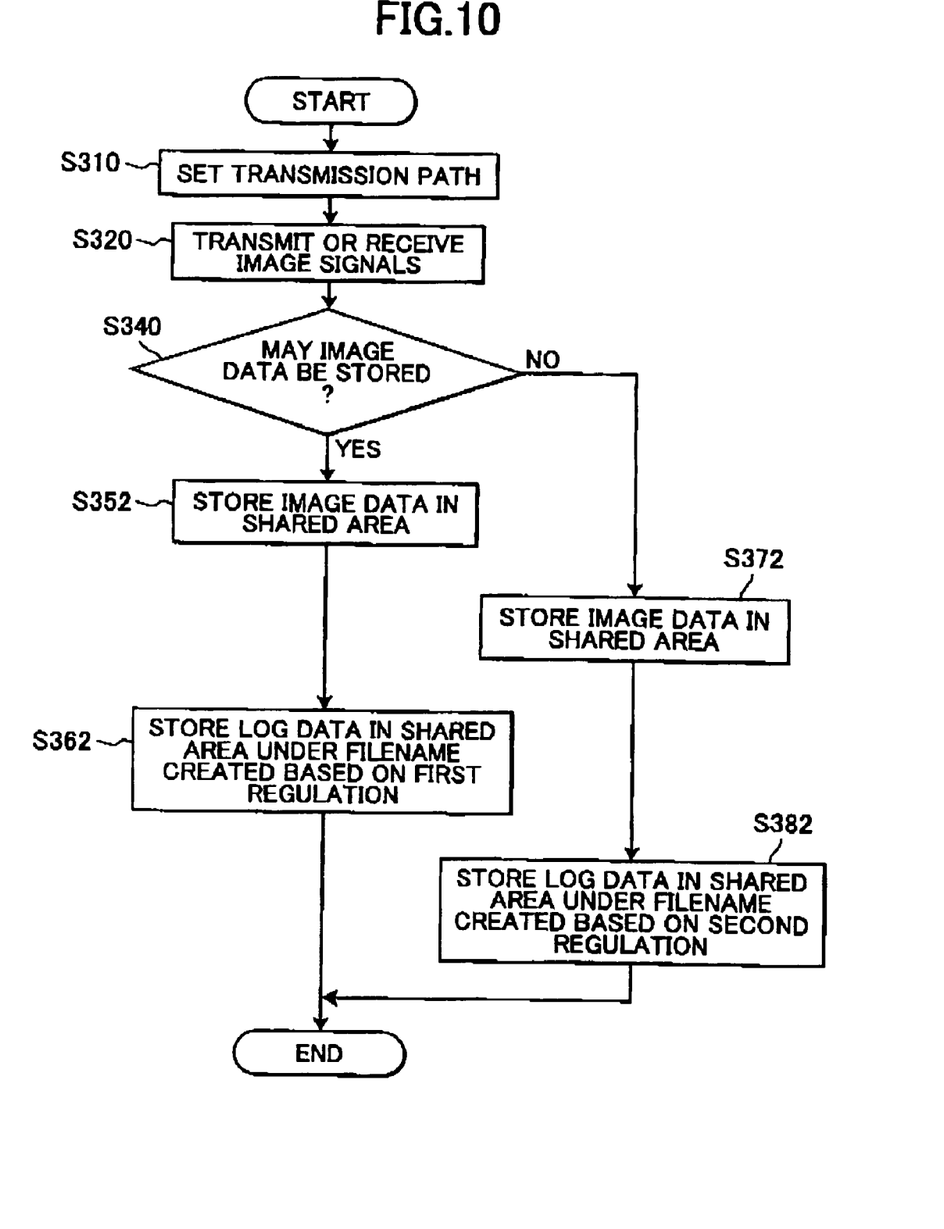
FIG. 10 is a flowchart showing steps in a facsimile communication process according to another modification of the embodiments.

For example, the following construction may be employed. As shown in FIG. 10, when the CPU 132 determines in S340 of FIG. 6 that the image data may be stored, then in S352 the CPU 132 stores the image data in the shared area of the RAM 140. In S362 the CPU 132 stores log data in the shared area of the RAM 140 under a filename determined according to a first regulation. However, if the CPU 132 determines in S340 that the image data may not be stored, then in S372 the CPU 132 stores the image data in the shared area of the RAM 140. In S382 the CPU 132 stores log data in the shared area of the RAM 140 under a filename determined according to a second regulation. Subsequently, on the PC 200 end, the CPU 212 checks the filename of log data stored in the shared area of the RAM 140 in the process of S420 in FIG. 7 and advances to S430 when the filename was determined according to the first regulation or to S480 when the filename was determined according to the second regulation. For example, the first regulation in this construction may determine filenames by combining strings of numbers for the date and time or the like with a character array indicating that the image data may be stored, that is, may be published unconditionally. Further, the second regulation in this construction may determine filenames by combining strings of numbers for the date and time or the like with a character array indicating that the image data may only be published with conditions. In addition, data generated according to the first or second regulation may also be appended to the log data in the processes on the multifunction device 100 end.

Further, in the second embodiment described above, a variety of conditions other than the condition described above may be used to determine whether a user of another terminal device connected to the communication network 600 may access a non-public log page. For example, only registered users (or administrators) may access a non-public log page. More specifically, in S500 of FIG. 7, the PC 200 generates both a non-public log page and an authentication page, which is a web page for prompting the user to input and return authentication data, and subsequently transfers this non-public log page and authentication page to the server 700. The server 700 is then configured to store authentication data on the server 700 itself (a storage device provided in the server 700) for authenticating the user as a registered user and to first transmit an authentication page when requesting a non-public log page, and subsequently transmit the non-public log page when the authentication data received based on the authentication page matches the prestored authentication data. With this construction, since it is possible to transmit a non-public log page only when the condition of the user being a registered user is met, only registered users can view content indicated on the non-public log page. The construction for authenticating a user is not limited to any specific construction and is obviously not limited to the construction described above.

What is claimed is:

1. A communication system comprising:
an image storing unit that stores image data transmitted or received through facsimile communications:
a page generating unit that generates a list page, the list page being a web page displaying a list of communication details associated with the image data transmitted or received through the facsimile communications, the list of communication details including hyperlinks to the associated image data stored in the image storing unit;
a page distributing unit that distributes via a network the list page generated by the page generating unit;
an access determining unit that automatically determines whether to allow access to the image data associated with the communication details of the facsimile communication, when the image data is transmitted or received through facsimile communications, based on contents of the communication details; and
a first storage commanding unit that stores image data transmitted or received through facsimile communications and communication details associated with the image data in the image storing unit,
wherein the page generating unit generates the list page having the hyperlinks only to the image data for which the access determining unit allows access, and
wherein the access determining unit determines whether to allow access to the image data when the image data is transmitted or received through facsimile communications, and the first storage commanding unit stores only the communication details in the image storing unit when the access determining unit determines not to allow access based on the communication details and stores the communication details and the associated image data in the image storing unit when the access determining unit determines to allow access based on the communication details.

2. A communication system comprising:
an image storing unit that stores image data transmitted or received through facsimile communications;
a page generating unit that generates a list page, the list page being a web page displaying a list of communication details associated with the image data transmitted or received through the facsimile communications, the list of communication details including hyperlinks to the associated image data stored in the image storing unit;
a page distributing unit that distributes via a network the list page generated by the page generating unit;
an access determining unit that automatically determines whether to allow access to the image data associated with the communication details of the facsimile communication, when the image data is transmitted or received through facsimile communications, based on contents of the communication details; and
a second storage commanding unit that stores image data and communication details associated with the image data in the image storing unit when the image data is transmitted or received through facsimile communications, wherein the access determining unit determines whether to allow access to the image data associated with the communication details based on the communication details stored in the image storing unit,
wherein the page generating unit generates the list page having the hyperlinks only to the image data for which the access determining unit allows access, and
wherein the page generating unit generates a first list page in which is displayed a list of communication details associated with image data for which the access determining unit determined to allow access and hyperlinks to the communication details, and a second list page in which is displayed a list of communication details associated with image data for which the access determining unit determined not to allow access and hyperlinks to the communication details, and wherein the page distributing unit distributes the first list page unconditionally and distributes the second list page only when specific distribution conditions have been met.

3. A communication system comprising a communication device and a terminal device connected to each other to be capable of performing data communications therebetween, wherein the communication device comprises:
an image storing unit that stores image data transmitted or received through facsimile communications;
a first storage commanding unit that stores image data transmitted or received through facsimile communications and communication details associated with the image data in the image storing unit; and
an access determining unit that determines whether to allow access to the image data associated with the communication details of the facsimile communication based on contents of the communication details, wherein the access determining unit determines whether to allow access to the image data when the image data is transmitted or received through facsimile communications, wherein the first storage commanding unit stores only the communication details in the image storing unit when the access determining unit determines not to allow access based on the communication details and stores the communication details and the associated image data in the image storing unit when the access determining unit determines to allow access based on the communication details,
wherein the terminal device comprises:
a page generating unit that generates a list page, the list page being a web page displaying a list of communication details associated with the image data transmitted or received through the facsimile communications, the list of communication details including hyperlinks to the associated image data stored in the image storing unit, wherein the page generating unit generates the list page having the hyperlinks only to the image data for which the access determining unit allows access; and a page distributing unit that distributes via a network the list page generated by the page generating unit.

4. The communication system according to claim 3, wherein the communication device further comprises a second storage commanding unit that stores image data and communication details associated with the image data in the image storing unit when the image data is transmitted or received through facsimile communications, wherein the access determining unit determines whether to allow access to the image data associated with the communication details based on the communication details stored in the image storing unit.

5. The communication system according to claim 4, wherein the second storage commanding unit stores the communication details associated with the image data for which the access determining unit determines to allow access in the image storing unit in a state capable of identifying that access is allowed, and stores the communication details associated with the image data for which the access determining unit determines not to allow access in the image storing unit in a state capable of identifying that access is not allowed.

6. The communication system according to claim 4, wherein the page generating unit generates a first list page in which is displayed a list of communication details associated with image data for which the access determining unit determined to allow access and hyperlinks to the communication details, and a second list page in which is displayed a list of communication details associated with image data for which the access determining unit determined not to allow access and hyperlinks to the communication details, and wherein the page distributing unit distributes the first list page unconditionally and distributes the second list page only when specific distribution conditions have been met.

7. The communication system according to claim 4, wherein the image storing unit can be recognized by the terminal device as an external storage device of the terminal device, the terminal device further comprising:

a data storing unit that stores various data;

a third storage commanding unit that stores, when data is stored in the image storing unit, the data stored in the image storing unit in the data storing unit; and a deletion commanding unit that deletes the data from the image storing unit after the data has been stored in the data storing unit by the third storage commanding unit.

8. A terminal device connected to and capable of performing data communications with a communication device, the terminal device comprising:

a page generating unit that generates a list page, the list page being a web page displaying a list of communication details associated with image data transmitted or received through facsimile communications, the list of communication details including hyperlinks to the associated image data, wherein the page generating unit generates the list page having the hyperlinks only to the image data for which access is allowed and concealing the hyperlinks associated with image data for which access is not allowed; and a page distributing unit that distributes via a network the list page generated by the page generating unit, wherein the page generating unit generates a first list page in which is displayed a list of communication details associated with image data for which access is allowed and hyperlinks to the communication details, and a second list page in which is displayed a list of communication details associated with image data for which access is not allowed and hyperlinks to the communication details, and wherein the page distributing unit distributes the first list page unconditionally and distributes the second list page only when specific distribution conditions have been met.

9. The terminal device according to claim 8, further comprising:

a data storing unit that stores various data;

a storage commanding unit that stores, when data is stored in a communication-end storing unit, the data stored in the communication-end storing unit in the data storing unit; and a deletion commanding unit that deletes the data from the communication-end storing unit after the data has been stored in the data storing unit by the storage commanding unit.

10. A computer-readable medium encoded with a computer program for controlling a terminal device connected to and capable of performing data communications with a communication device, the program comprising:

a program of generating a list page, the list page being a web page displaying a list of communication details associated with image data transmitted or received through facsimile communications, the list of communication details including hyperlinks to the associated image data, wherein the program of generating generates the list page having the hyperlinks only to the image data for which access is allowed and concealing the hyperlinks associated with image data for which access is not allowed; and a program of distributing via a network the list page generated by the program for generating, wherein the program of generating generates a first list page in which is displayed a list of communication details associated with image data for which access is allowed and hyperlinks to the communication details, and a second list page in which is displayed a list of communication details associated with image data for which access is not allowed and hyperlinks to the communication details, and wherein the program of generating distributes the first list page unconditionally and distributes the second list page only when specific distribution conditions have been met.

* * * * *